US008111971B2

(12) United States Patent
Akgul

(10) Patent No.: US 8,111,971 B2
(45) Date of Patent: Feb. 7, 2012

(54) SYSTEMS AND METHODS OF REDUCING MEDIA STREAM DELAY THROUGH INDEPENDENT DECODER CLOCKS

(75) Inventor: Tankut Akgul, Instanbul (TR)

(73) Assignee: Cisco Technology, Inc., San Jose, CA (US)

( * ) Notice: Subject to any disclaimer, the term of this patent is extended or adjusted under 35 U.S.C. 154(b) by 696 days.

(21) Appl. No.: 12/328,071

(22) Filed: Dec. 4, 2008

(65) Prior Publication Data
US 2009/0148131 A1    Jun. 11, 2009

Related U.S. Application Data

(60) Provisional application No. 60/992,714, filed on Dec. 5, 2007, provisional application No. 61/013,077, filed on Dec. 12, 2007.

(51) Int. Cl.
H04N 5/932 (2006.01)
H04N 5/935 (2006.01)
(52) U.S. Cl. ........................................ 386/200; 386/203
(58) Field of Classification Search .......... 386/200–203, 386/211, 214
See application file for complete search history.

(56) References Cited

U.S. PATENT DOCUMENTS

| 5,808,722 | A | * | 9/1998 | Suzuki | ............................. | 352/12 |
| 5,960,006 | A |   | 9/1999 | Maturi et al. | ................. | 370/509 |
| 6,018,376 | A | * | 1/2000 | Nakatani | .................. | 375/240.28 |
| 6,078,725 | A | * | 6/2000 | Tanaka | .......................... | 386/241 |
| 6,130,987 | A | * | 10/2000 | Tanaka | .......................... | 386/254 |
| 6,163,646 | A | * | 12/2000 | Tanaka et al. | ................. | 386/201 |

FOREIGN PATENT DOCUMENTS

| EP | 1 432 250 A1 | 6/2004 |
| WO | WO 03/094518 A1 | 11/2003 |

OTHER PUBLICATIONS

International Search Report dated Sep. 3, 2009 cited in Application No. PCT/US2008/085613.
E. Steinbach, "Adaptive Abspieltechniken für Internet-Mediastreaming," XP-001220605, vol. 57, No. 1/02, Jan. 2003, pp. 22-25 (English translation unavailable).

* cited by examiner

Primary Examiner — Thai Tran
Assistant Examiner — Nigar Chowdhury
(74) Attorney, Agent, or Firm — Merchant & Gould

(57) ABSTRACT

In one embodiment, a method of reducing video delay in a program stream comprises: setting an audio reference clock to an initial value based on a presentation timestamp for a frame that is the first decodable frame in the audio stream; setting a video reference clock to an initial value based on a presentation timestamp for a frame that is the first decodable frame in the video stream; starting audio and video reference clocks responsive to the later of a minimum buffer fill delay and receipt of a frame that is the first entire decodable frame in the video stream; decoding the audio stream in accordance with the audio reference clock; and decoding the video stream in accordance with the video reference clock.

19 Claims, 8 Drawing Sheets

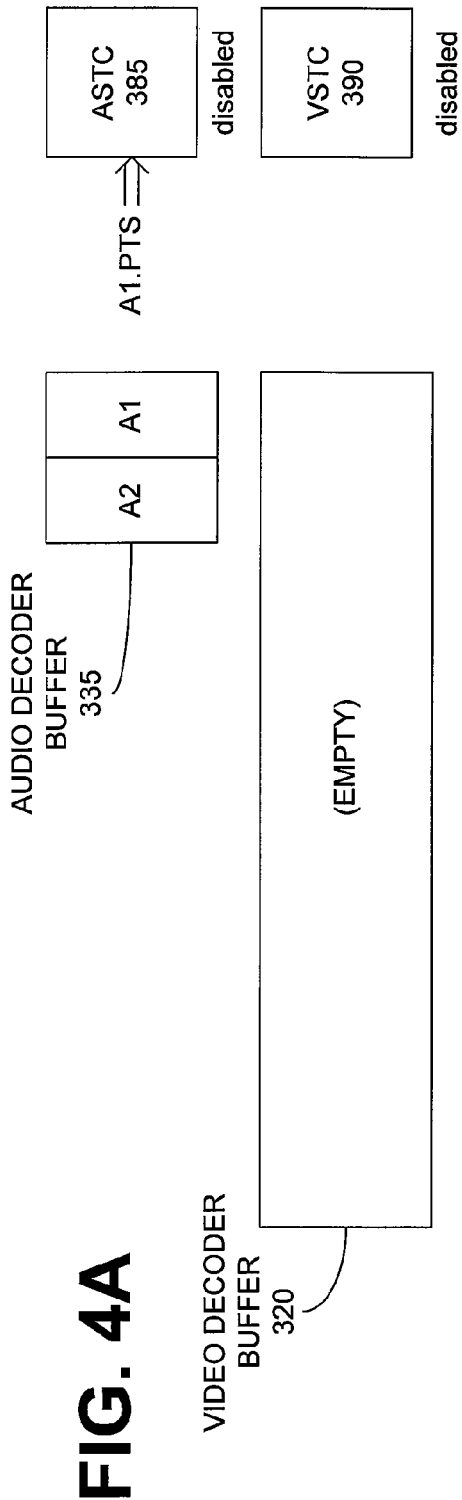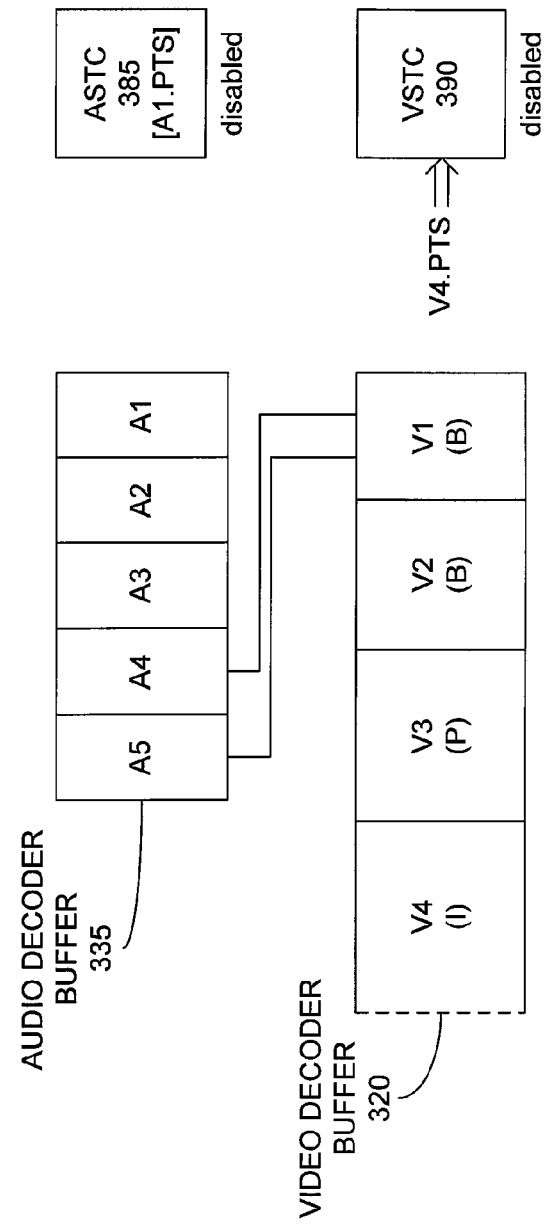

SYSTEMS AND METHODS OF REDUCING MEDIA STREAM DELAY THROUGH INDEPENDENT DECODER CLOCKS

CROSS REFERENCE TO RELATED APPLICATIONS

This application claims the benefit of U.S. Provisional Application No. 60/992,714, filed Dec. 5, 2007 and claims the benefit of U.S. Provisional Application No. 61/013,077, filed Dec. 12, 2007, each of which is entirely incorporated herein by reference.

FIELD OF THE DISCLOSURE

The present disclosure relates to digital media delivery, and more specifically, to systems and methods of reducing media stream delay.

BACKGROUND

A growing number of consumers now have high-speed, or broadband, connections to the Internet in their homes. The increased bandwidth provided by these broadband connections allows the delivery of digital television, video, and multimedia services to customer premises (e.g., home consumers). These services are transported over a network as media streams. At the customer premises, a digital media receiver decodes one or more media streams. The digital media receiver also generates a picture signal for display by a television or monitor. A switch to a different media stream results in a finite amount of delay before the new stream can be decoded and displayed. Some amount of delay may be unavoidable with digital streams, but consumers prefer a relatively small delay.

BRIEF DESCRIPTION OF THE DRAWINGS

Many aspects of the disclosure can be better understood with reference to the following drawings. The components in the drawings are not necessarily to scale. Emphasis is instead placed upon clearly illustrating the principles of the present disclosure.

FIGS. 4A-4D show the contents of the video and audio decoders of FIG. 3 at various points in time, and show how the ASTC and VSTC of FIG. 3 are adjusted in response to the arrival of various frames in the buffers.

DETAILED DESCRIPTION

Overview

Figure 1:
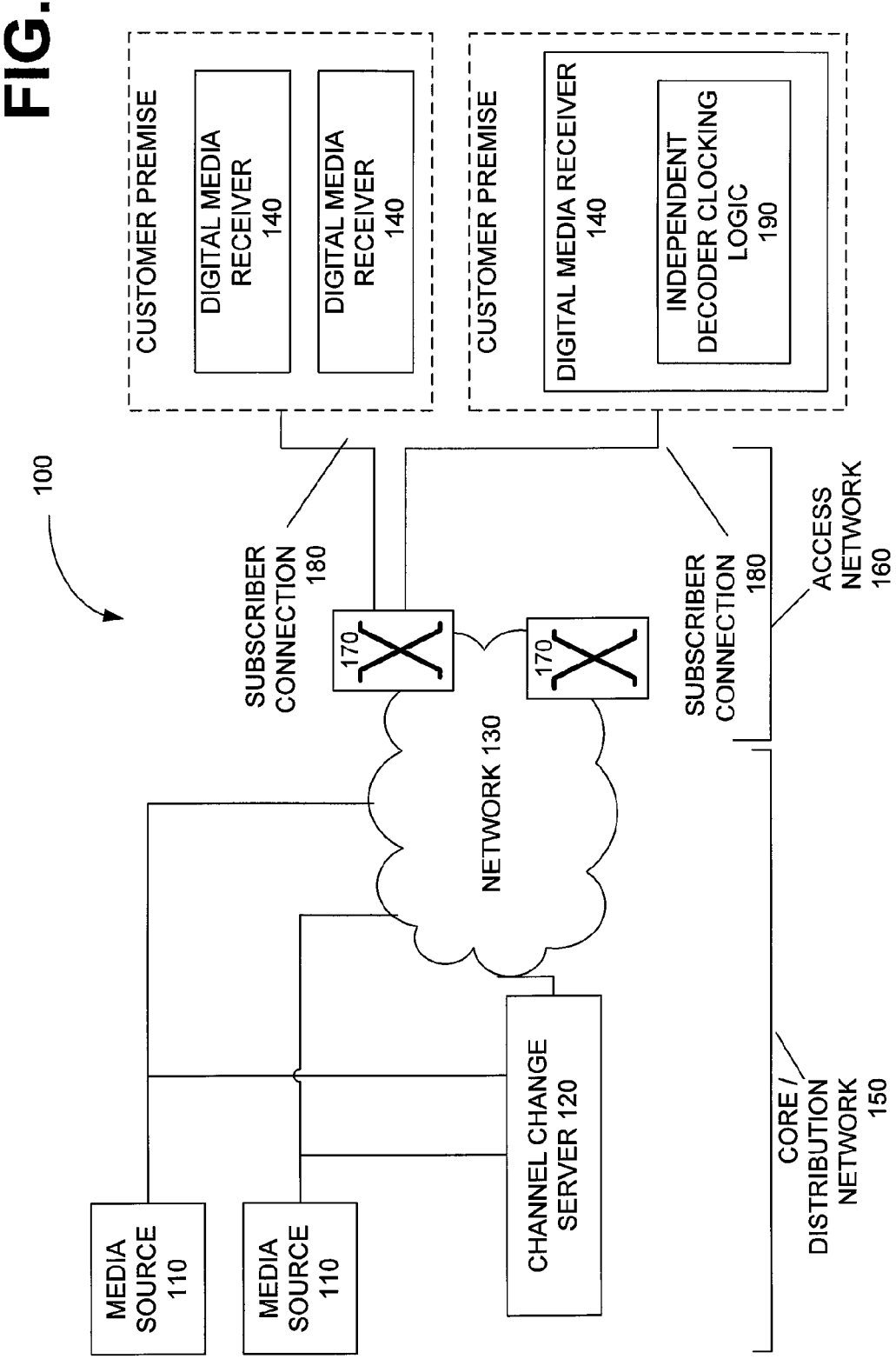
FIG. 1 is a block diagram of an environment in which one embodiment of a system and method for synchronizing media streams is located.

Embodiments are disclosed herein that provide systems, devices, and methods of reducing video delay in a program stream, the program stream comprising a video and an audio stream. One such embodiment is a method which includes: setting an audio reference clock to an initial value based on a presentation timestamp for a frame that is the first decodable frame in the audio stream; setting a video reference clock to an initial value based on a presentation timestamp for a frame that is the first decodable frame in the video stream; starting audio and video reference clocks responsive to the later of a minimum buffer fill delay and receipt of a frame that is the first entire decodable frame in the video stream; decoding the audio stream in accordance with the audio reference clock; and decoding the video stream in accordance with the video reference clock.

One such digital media playback device includes: an audio reference clock; an audio decoder buffer configured to store received frames in an audio stream; an audio decoder configured to decode frames in the audio decoder buffer at times based on a comparison of a time stamp for each frame and a current value of the audio reference clock; a video reference clock; a video decoder buffer configured to store received frames in a video stream, the video stream and the audio stream making up a program stream; a video decoder configured to decode frames in the video decoder buffer at times based on a comparison of a timestamp for each frame and a current value of the video reference clock; and independent decoder clocking logic. The independent decoder clocking logic is configured to: set the audio reference clock to an initial value based on a presentation timestamp for a frame that is the first decodable frame in the audio stream; set the video reference clock to an initial value based on a presentation timestamp for a frame that is the first decodable frame in the video stream; and start the audio and the video reference clocks responsive to the later of a minimum buffer fill delay and receipt of a frame that is the first entire decodable frame in the video stream.

Another such digital media playback device includes: means for generating an audio reference clock; means for buffering frames in a received audio stream; means for decoding frames in the audio decoder buffer according to the audio reference clock; means for generating a video reference clock; means for buffering frames in a received video stream, the video stream and the audio stream making up a program stream; means for decoding frames in the video decoder according to the video reference clock; means for setting an initial value of the audio reference clock based on receipt of a frame that is the first decodable audio frame in the audio stream; means for setting an initial value of the video reference clock based on receipt of the start of a frame that is the first decodable frame in the video stream; and means for starting the audio and the video reference clocks on the later of a minimum buffer fill delay and receipt of the entire first decodable frame in the video stream.

Example Embodiments

FIG. 1 is a block diagram of an environment in which one embodiment of a system and method for synchronizing media streams is located. System 100 delivers various digital services to subscribers, which may include television programming, video-on-demand, pay-per-view, music, internet access, shopping, and telephone. These services are delivered using media streams, which may be provided from various sources. One such source is a media source 110, which encodes content from a media source, such as a cable network or an on-air television station. Streams produced by media source 110 are captured and buffered for some period of time by a channel change server 120 in order to provide (in some embodiments) error recovery and accelerated channel change capabilities. Note that there may be other types of media sources in addition to the encoders.

Other sources of media streams should be familiar to a person of ordinary skill in the art, and are intended to be within the scope of this disclosure. Various media stream sources may be located at a facility known as a "head end" which is operated by a service provider (e.g., cable television company). However, these components are not limited to residing at that location. Common encoding formats for media streams include MPEG-2, MPEG-4, and VC-1, but others are contemplated to be within the scope of this disclosure. In some environments, the encoded media stream represents a single user program, and thus contains a video elementary stream and an audio elementary stream multiplexed together into a single program transport stream (SPTS).

Media streams are delivered over a network 130 to one or more digital media receivers 140. In the example environment of FIG. 1, network 130 includes a core/distribution network 150 and an access network 160. Multiple media streams are combined and packetized into a media packet stream, in a form which is suitable for transport over core/distribution network 150. A media packet stream, carrying multiple user programs that are destined for many different subscribers, is transported over core/distribution network 150, and delivered to various switches 170 located at the network edge. Each switch 170 selects, for a particular subscriber, a subset of the programs carried in the media packet stream, and produces a stream which is delivered, via subscriber connections 180, to those subscribers connected to switch 170. In some embodiments the delivered stream uses multicast addresses, while in other embodiments unicast addresses are used.

Digital media receiver 140 receives, via subscriber connection 180, a media packet stream carrying the selected programs. Digital media receiver 140 converts the stream of media packets into an analog or digital video signal, which is supplied to a display (e.g., a television or computer monitor) for viewing by a customer. Some embodiments of digital media receiver 140 also provide interactive features, such as an electronic program guide (EPG), web browser, or DVR (digital video recorder) functionality. In some embodiments, digital media receiver 140 takes the form of a set-top box. In others, digital media receiver 140 is implemented by a personal computer (PC). The term "digital media receiver" extends to other types of receivers that include the capability to receive and process compressed digital video streams. Examples of other types of receivers include: hand-held and/or mobile receivers that are coupled to a transmission channel which carries media packet streams; video-services-enabled receivers (VSERs); and other electronic devices such as media players.

As explained earlier, a subset of program streams is selected by switch 170 for delivery to a particular subscriber location. Each of these program streams can be viewed as being carried on a different logical channel. Digital media receiver 140 communicates with channel change server 120 to request that particular program streams, or logical channels, be included in the media packet stream received by that subscriber. For example, digital media receiver 140, in response to a user request to watch the FOX network, requests a channel change from channel change server 120, with the target channel as FOX. In some embodiments, channel change logic within digital media receiver 140 interacts with channel change server 120 and with decoders in digital media receiver 140 to switch from one stream to another.

Although the term "channel change" is used herein, this term is not limited to user requests. This term is also intended to cover requests that are not user-initiated (e.g., an automatic change to a logical channel at a specific time for recording or viewing). The term "channel" is not limited to a traditional television channel, but encompasses any stream associated with a particular media content instance or service.

A channel change (or other stream transition event) causes digital media receiver 140 to begin decoding a different stream. As a result, some amount of delay is incurred before the content of the new stream can be decoded and displayed. Digital media receiver 140 includes independent decoder clocking logic 190, which implements a system and/or method for reducing media stream delay through independent decoder clocks. A brief overview of timestamps and clocking is now presented, and then logic 190 will be described further in connection with FIG. 2, FIG. 3, FIGS. 4A-4D, FIG. 5, FIG. 6, and FIG. 7.

A program stream typically includes a video stream and a corresponding audio stream. These two types of streams experience different amounts of delay or latency in the system. A transmitted reference clock in combination with timestamps in the video and audio streams allows synchronization of the two streams at digital media receiver 140. Media source 110 generates the reference clock and periodically inserts timestamps, in the form of program clock references (PCR) or system clock references (SCR), into the transmitted stream. Digital media receiver 140 recovers the clock reference by using a local oscillator which is corrected by the clock references (PCR/SCR) received from media source 110. The recovered clock may be known as the System Time Clock (STC). Media source 110 also inserts decoding and presentation timestamps (DTS/PTS) in the video and audio streams. A decoding timestamp (DTS) determines when the frame will be provided to the decoder for decoding, while a presentation timestamp (PTS) determines when the decoder outputs the frame for display. In this disclosure, the term "timestamp" can refer to DTS, PTS, or both.

Figure 2:
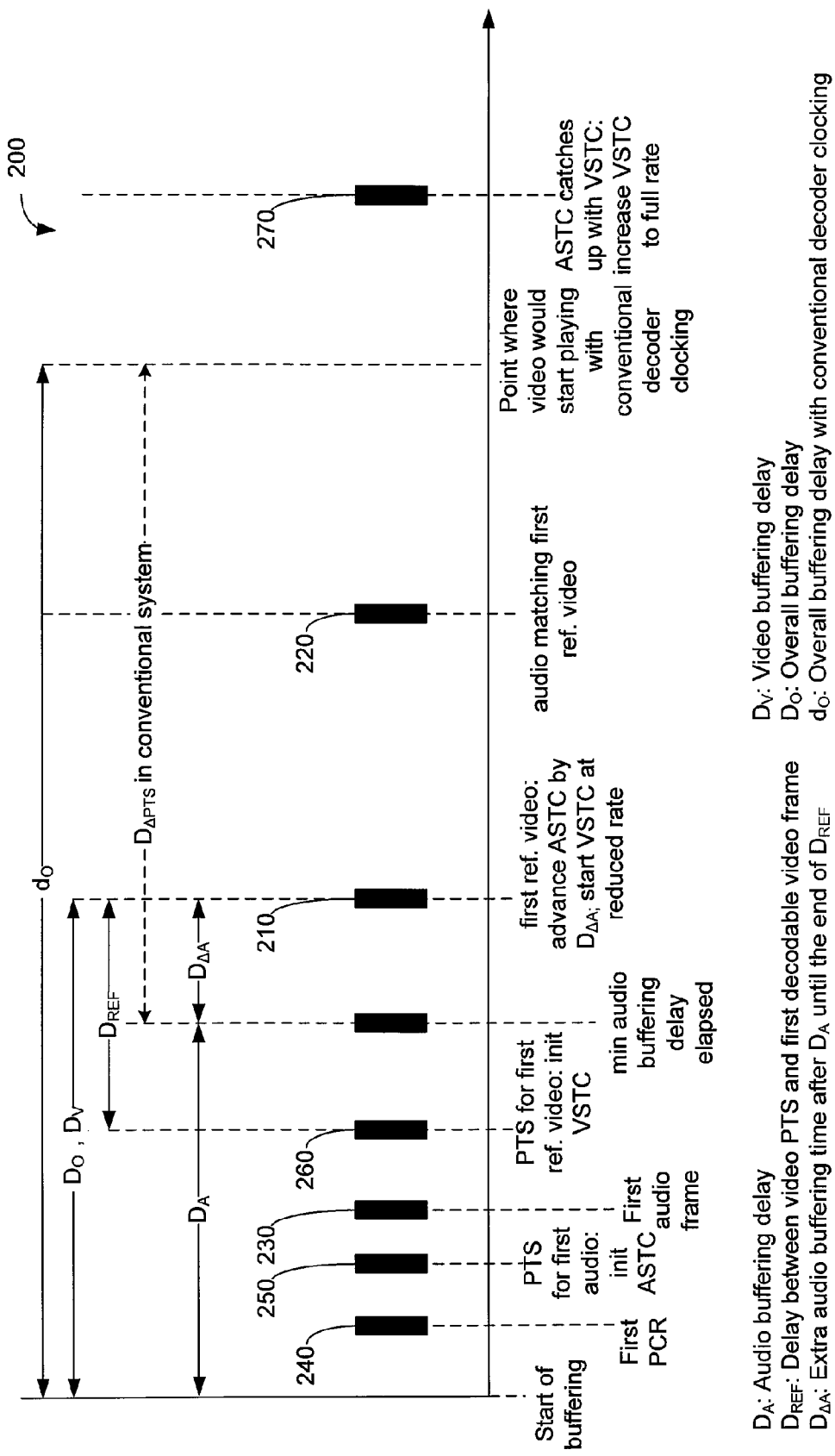
FIG. 2 is a block diagram showing audio and video frame reception and processing at the digital media receiver of FIG. 1.

The techniques employed by independent decoder clocking logic 190 to reduce media stream delay will now be described in connection with FIG. 2. Audio and video frame reception and processing at digital media receiver 140 is illustrated with reference to a timeline 200. The earliest point in time appears on the left of timeline 200, although the scale is not necessarily linear. Since video processing generally takes longer than audio processing, digital media receiver 140 generally requires video to be buffered longer than audio. As a consequence of this requirement, media source 110 sends the first reference video frame 210 in advance of the corresponding or matching audio frame 220. Yet video frame 210 and audio frame 220 are presented at the same time since they have equal PTS values (and thus are synchronized). This means the first audio frame 230 that started to be received contemporaneously with first video frame 210 has a PTS value smaller than the first video frame 210—as do all audio frames (not shown) received before audio frame 220. Stated differently, those audio frames are late with respect to the first video frame 210. Therefore, when used with conventional decoder clocking techniques, this advance/delay causes an initial difference between the PTS for video frames relative to the PTS for audio frames ($D_{\Delta PTS}$). The systems and methods disclosed herein reduce $D_{\Delta PTS}$ as compared to conventional systems by using separate reference clocks for the video and audio decoders in digital media receiver 140. Details of the clocking will be described below in connection with FIG. 3, FIGS. 4A-4D, FIG. 5, and FIG. 6, but the overall scheme will be described with reference to timeline 200 in FIG. 2.

When the first Program Clock Reference 240 is received, the video and audio decoder clocks in digital media receiver 140 are not started (in contrast to a conventional clocking scheme). Instead, the audio system time clock (ASTC) is initialized—but not started—when the PTS for the first decodable audio frame 250 is received. The video STC (VSTC) is initialized—but not started—when the PTS for the first decodable video frame 260 is received. Both ASTC and VSTC are started when two conditions are met. First, a minimum required audio buffering delay $D_A$ has passed from the start of stream buffering. This delay $D_A$ allows the audio decoder buffer level to build up to an appropriate underrun threshold, where the value of $D_A$ depends on various characteristics of the content and the network (e.g., degree of compression, network jitter, etc.). The second condition required for ASTC and VSTC to start running is that a delay $D_{REF}$ has elapsed, starting from the point in time where VSTC was initialized. This delay is equal to the time to completely receive the first decodable video frame into the video decoder buffer. In some embodiments, this delay is data-dependent, and independent decoder clocking logic 190 is notified when the entire I-frame is received into, or retrieved from, the decoder buffer. In other embodiments, logic 190 relies on a pre-calculated delay based on a typical size of a group of pictures.

When these conditions are met, both decoder clocks are started at the same time, with VSTC running at a slower rate than ASTC. In some embodiments, VSTC runs at about 80% of ASTC, but other ratios are possible. When ASTC catches up with VSTC, the VSTC rate is adjusted to match ASTC. If, by the time $D_{REF}$ elapses, $D_A$ has already elapsed, the initial value of ASTC is incremented by the overshoot audio delay $D_{AA}$ (the difference between the time that $D_A$ elapsed and the time that $D_{REF}$ elapsed). Since, in this case, the minimum audio buffering delay $D_A$ has already been satisfied, this increment prevents audio from being buffered more than required by discarding $D_{AA}$ amount of audio buffer from the beginning. It also minimizes the difference between the initial values of VSTC and ASTC and thus allows ASTC to catch up with VSTC quicker. Note that since both STCs are started at the same time without having to wait for $D_{\Delta PTS}$ (i.e., for the audio frame 220 matching the first video frame 210 to arrive at digital media receiver 140), independent decoder clocking logic 190 reduces the initial video buffering delay, as compared to the conventional decoder, a reduction of $D_{\Delta PTS}$-$D_{AA}$ (which is equal to $D_{\Delta PTS}$ when $D_{AA}$ is zero).

To summarize, digital media receiver 140 uses separate reference clocks for the video and the audio decoders. The video and audio frames are then consumed from their respective buffers at a rate determined by their respective reference clocks, where these two rates differ. The video decoder is initialized with a value which represents a time value later than the audio decoder's initial time value, and the two clocks are started at the same time. Therefore, the video clock starts at a position which is ahead of the audio clock, which means video presentation begins at a position which is ahead of audio presentation. However, the video clock rate is set to be slower than the audio clock rate, so the audio stream "catches up" at some point with the video stream. At this point, the video decoder clock speed is increased to match the audio decoder clock speed, and both run at the same rate.

Figure 3:
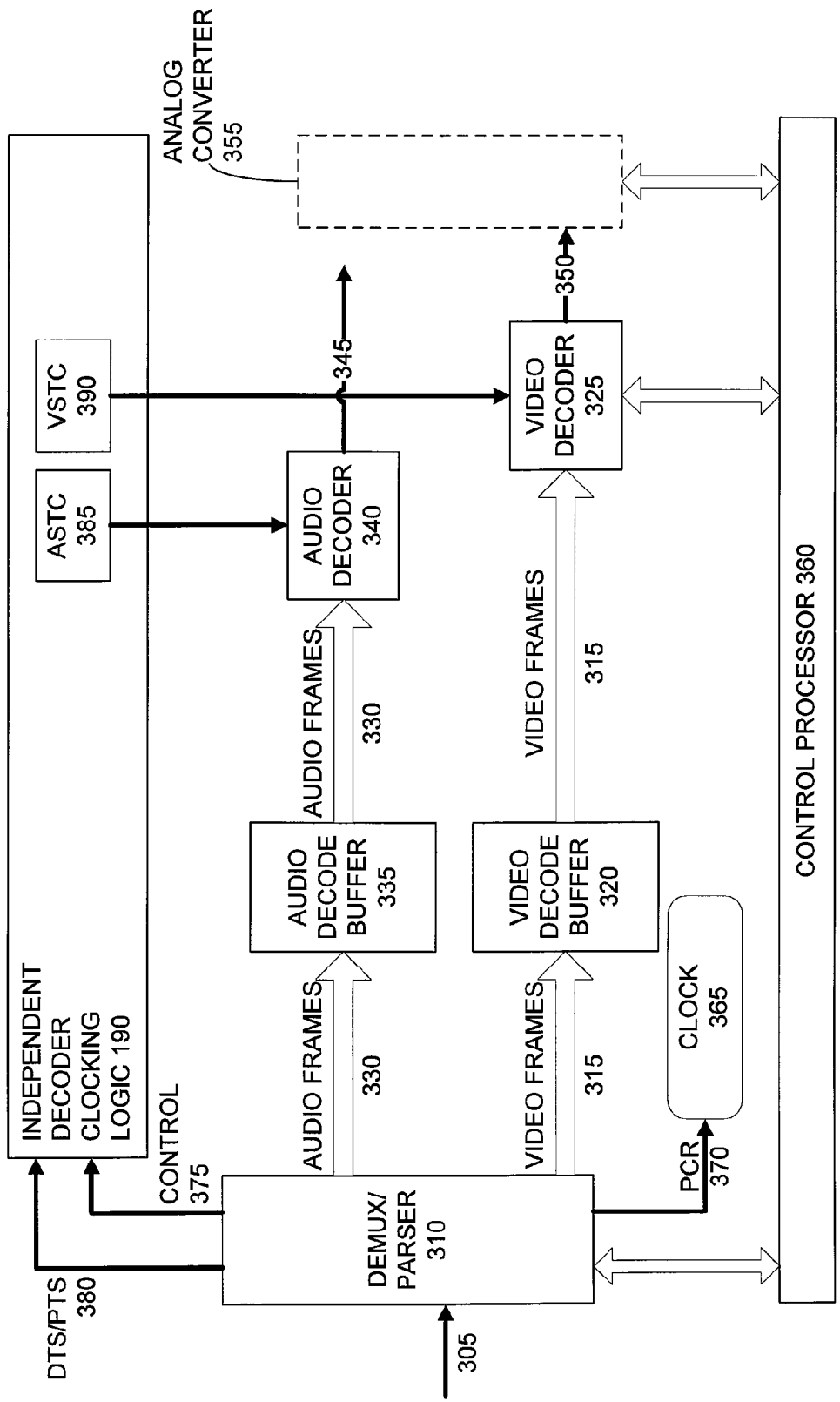
FIG. 3 is a block diagram of selected components within the digital media receiver of FIG. 1.

FIG. 3 is a block diagram of selected components within digital media receiver 140. A digital media transport stream 305, which contains different stream types, is provided to a transport stream demultiplexer/parser 310. Demultiplexer 310 identifies audio and video streams through program identifiers (PIDs) carried within stream 305. Video frames 315 from stream 305 are stored in a video decoder buffer 320, then decoded by a video decoder 325. Audio frames 330 from stream 305 are stored in an audio decoder buffer 335 then decoded by an audio decoder 340. After decoding, audio data 345 is provided as output to a speaker and video data 350 is provided as output to a display. In the embodiment of FIG. 3, the data is converted to analog by converter 355, but this conversion is optional. Operation of the various components in the decoder pipeline may be coordinated by a control processor 360.

Demultiplexer/parser 310 also performs a parsing function, extracting program clock reference (PCR) values from transport stream packets and timestamps (DTS and/or PTS) from packetized elementary stream (PES) packets. Receiver clock 365 is controlled by a local oscillator (not shown) and the PCR values 370 are used to correct phase error relative to the transmitter clock. Independent decoder clocking logic 190 also receives various control signals 375 from demultiplexer 310 which indicate the arrival of various types of frames and drive the behavior of logic 190 as described earlier in connection with FIG. 2—such as new stream, first PCR, first audio PTS, first audio frame, first video PTS, start of first decodable video frame, end of first decodable video frame, etc. Logic 190 also receives timestamps 380 (DTS and/or PTS) from demultiplexer 310 in conjunction with appropriate control signals 375. Audio decoder 340 is driven by audio clock values pulled from ASTC register 385 and video decoder 325 is driven by video clock values pulled from VSTC register 390, where those registers are initialized and counting is enabled as described earlier in connection with FIG. 2. Logic 190 also includes various parameters (e.g., relative audio delay $D_A$, overshoot audio delay $D_{AA}$, VSTC rate, and ASTC rate (not shown)).

The operation of digital media receiver 140 will now be described. FIGS. 4A-4D show the contents of video decoder buffer 320 and audio decoder buffer 335 at various points in time, and show how the values in ASTC 385 and VSTC 390 are adjusted in response to the arrival of various frames in the buffers. FIG. 5 illustrates the playout behavior resulting from the two different decoder clocks. In FIGS. 4A-4D and FIG. 5, an audio frame and a video frame having the same PTS value (i.e., those that appear to the viewer to be "lip sync'ed") are shown with a line connecting the two frames.

FIG. 4A depicts the digital media stream shortly after a new stream is acquired (e.g., as a result of a channel change). ASTC 385 and VSTC 390 are not yet initialized, and are not running. (Since the clocks were running to decode the previous stream, in some embodiments the two clocks are stopped upon detection of a new stream.) Shortly after the stream is acquired, the first few audio frames arrive in audio decoder buffer 335. The arrival of the first decodable audio frame with a PTS (A1) triggers the initialization of ASTC 385, which is set to that PTS. In this example, ASTC 385 is therefore set to the PTS of A1. Although ASTC 385 has been initialized, the clock is not started yet. (Conditions for starting ASTC 385 will be described below). Note that in most encoding schemes, all audio frames are decodable, but the techniques described herein also cover encoding schemes that allow for non-decodable audio frames. Next, another audio frame A2 is received. At this point, audio decoder buffer 335 contains A1-A2 and video decoder buffer 320 is empty.

FIG. 4B depicts the digital media stream at a later point in time, when the start of the first reference video frame arrives in video decoder buffer 320. By this time, audio decoder buffer 335 contains A1-A5, and video decoder buffer 320 includes complete frames V1 and V2 (B-frames), V3 (P-frame), and the start of V4 (I-frame). V4 is an I-frame that is the first decodable video frame, and the arrival of the PTS for this first decodable video frame triggers the initialization of VSTC 390 by independent decoder clocking logic 190. VSTC 390 is set to the PTS of the first received decodable video frame. In this example, VSTC 390 is set to the PTS of the I-frame V4. Although VSTC 390 has been initialized, the clock is not started yet. (Conditions for starting VSTC 390 will be described below).

Note that there are no lines between audio frame A1 and any video frame or between audio frame A2 and any video frame. Although A1 and A2 are in the buffer contemporaneously with V1 and V2, A1 and A2 are not meant to be presented at the same time as V1 and V2. This is typical behavior: video and audio that are played back at the same time do not typically appear in the received data stream at the same time. Instead, video frames typically appear in the received data stream earlier than those audio frames with the same PTS, because video takes longer to buffer.

Figure 4C:
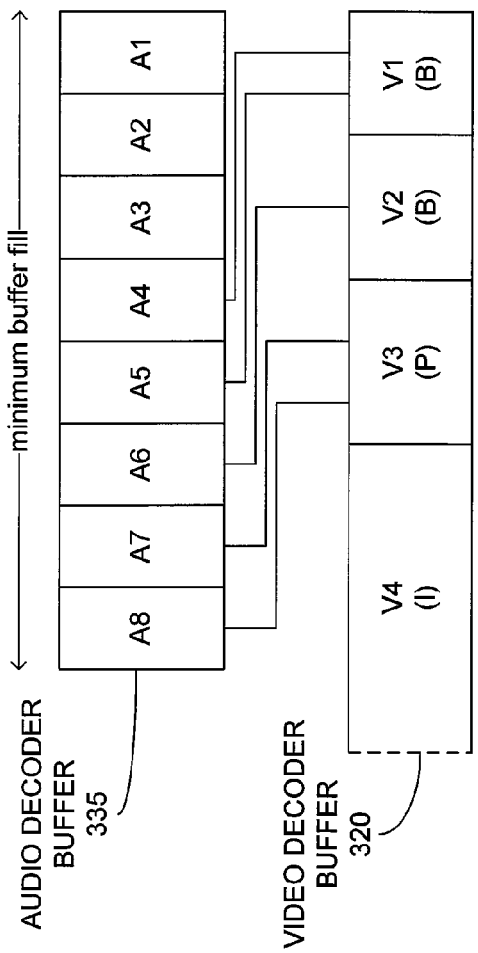
Figure 5:
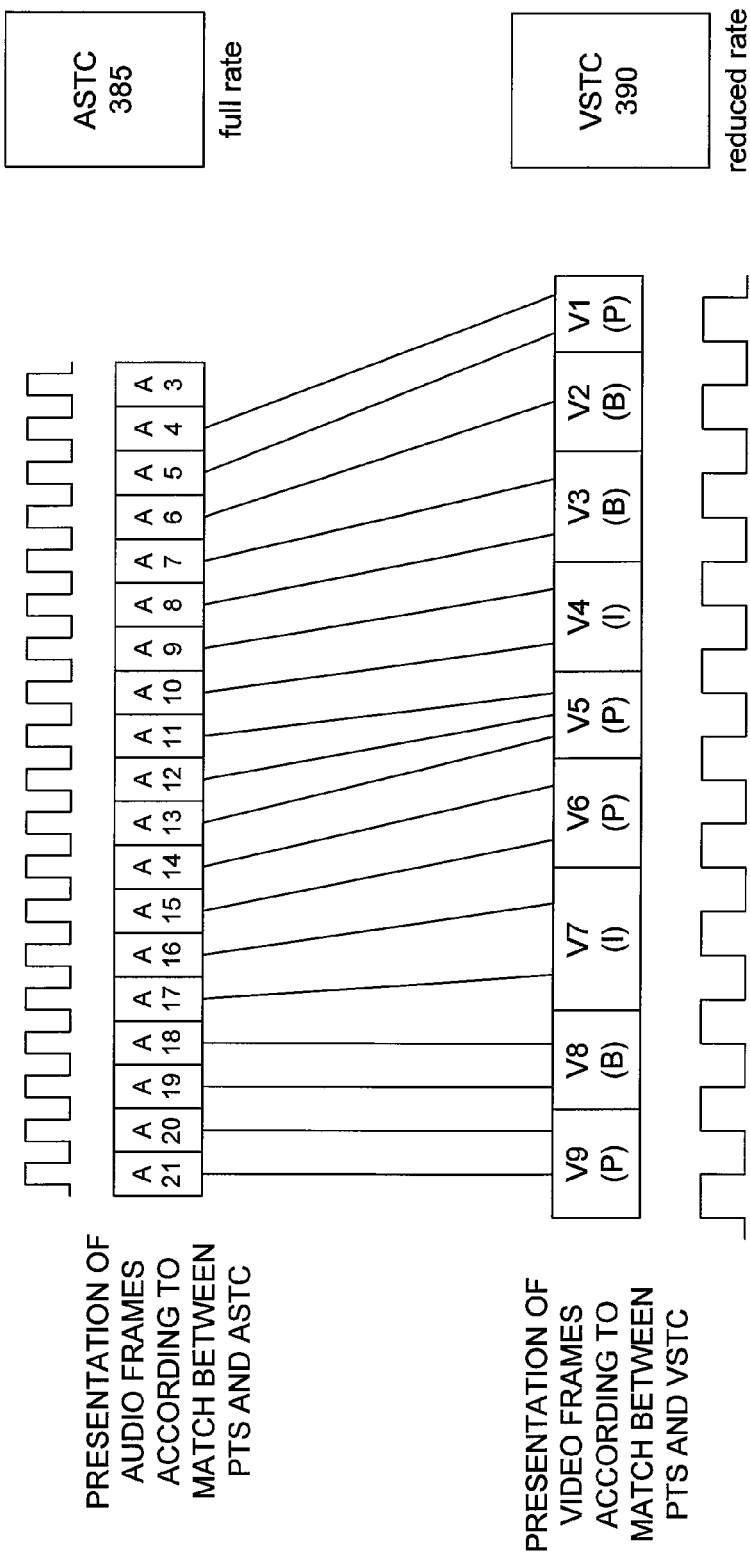
FIG. 5 illustrates the playout behavior resulting from the two different decoder clocks within the digital media receiver of FIG. 1.

FIG. 4C depicts the digital media stream at a later point in time, when audio decoder buffer 335 is filled to a minimum level (determined by the offset between PCR and audio PTS). This offset is a fixed value, typically on the order of 100 ms, so the minimum can be any value larger than this fixed value. When the audio buffer reaches this minimum, independent decoder clocking logic 190 determines whether the first decodable video frame has been completely received into video decoder buffer 320. In the example scenario of FIG. 4C, the first decodable video frame V4 is only partially received (as denoted by dashed line at the left edge of V4). Therefore, independent decoder clocking logic 190 does not start ASTC 385 and VSTC 390. However, if the video frame had been completely received, logic 190 would enable ASTC 385 and VSTC 390 at the same time.

If the first decodable video frame has not been completely received, logic 190 waits for an extra amount $D_{A4}$ until the first decodable video frame is completely received and increments ASTC 385 by this extra wait amount to preserve the original audio buffering amount. Then, logic 190 enables ASTC 385 and VSTC 390 at the same time.

Figure 4D:
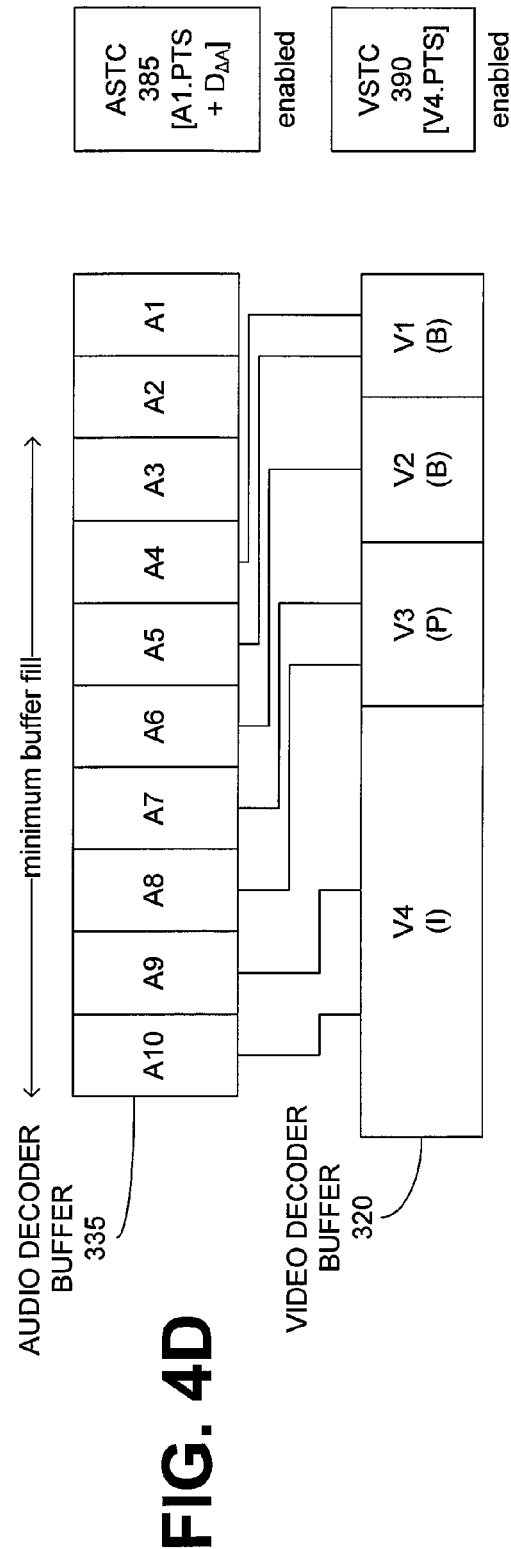

FIG. 4D depicts the digital media stream at a later point in time, at which the first decodable video frame has been completely received. The audio decoder buffer now contains A1-A10. The video decoder buffer contains complete frames V1 (B-frame), V2 (B-frame), V3 (P-frame), and V4 (I-frame). Since the first decodable video frame is completely received, independent decoder clocking logic 190 advances ASTC 385 by $D_{A4}$ (to preserve the original minimum audio buffering amount) and then starts ASTC 385 and VSTC 390. Since ASTC 385 was originally initialized to A1. PTS in FIG. 4A, in this scenario ASTC starts counting (i.e., periodically incrementing) from an initial value of A1.PTS+$D_{A4}$, which is equal to A3.PTS. VSTC 390 starts counting (i.e., periodically incrementing from an initial value of V4.PTS.

As mentioned earlier, independent decoder clocking logic 190 initially configures VSTC 390 to run at a slower rate than ASTC 385, to allow the audio stream—which starts with a lag relative to the video stream—to catch up to the video stream. Some implementations of logic 190 implement VSTC 390 and ASTC 385 partially in software, using two virtual registers which are incremented by interrupts from a single physical timer. These registers serve as the source for VSTC 390 and ASTC 385, respectively. By adjusting the amount of the increment which occurs with each timer interrupt, the rate of VSTC 390 and ASTC 385 can be changed relative to each other. Other implementations use two hardware timers, which may be derived from a common clock.

The playout behavior of the two streams will now be described in connection with FIG. 5. The presentation time of audio frames is shown in conjunction with running ASTC 385. The presentation time of video frames is shown in conjunction with running VSTC 390. In this diagram, the earliest point in time is on the right. As explained earlier, VSTC 390 runs at a reduced rate compared to ASTC 385, so the clock period of VSTC 390 is longer than the clock period of ASTC 385.

The first video frame to be presented is V4. (Frames V1 through V3 are received, but cannot be presented before the reference frame). At the same time, audio frames A3 and A4 are presented. (Frames A1 and A2 cannot be presented because ASTC has already been advanced beyond the PTS of those two frames). However, the audio frames corresponding to V4 are A9 and A10. (This correspondence was indicated earlier in FIG. 4C, and again in FIG. 4D with a line connecting A9 to V4, and another line connecting A10 to V4.) Thus, when seeing V4 and hearing A3, the user perceives that the frames are out of sync. As the next few video frames are presented from the buffer, the user still perceives that the frames are not synchronized and further, that the audio lags the video. However, because video frames are presented at a slower rate than are audio frames, the audio stream has caught up with the video stream by the time V8 is presented. This behavior is illustrated in FIG. 5 by the vertical line between V8 and A18.

Independent decoder clocking logic 190 tracks the difference between VSTC and ASTC values. When the two are equal, logic 190 adjusts the rate of VSTC 390 to match the rate of ASTC 385. After that, the two decoder clocks run at the same rate. If another channel change occurs, logic 190 is invoked again to stop the running of the decoder clocks, re-initialize the clocks based on frames received in the decoder buffers, and start the clocks again based on frames received.

Thus, the overall effect of independent decoder clocking logic 190 can be summarized as follows. After an initial buffering delay, the video and audio streams start playing at the same time. Since the encoder sends video first (relative to its corresponding audio), audio initially lags video, and a viewer experiences audio and video as being out of sync. However, because video plays out at a slower rate, audio catches up with video at some point, and the user experiences the streams as being in sync. Once this sync is established, the audio and video remain synchronized—the effects of the channel change have disappeared.

This method improves the initial video buffering time by an amount approximately equal to the time difference between audio and video. Furthermore, this buffering time is gained back during the slow playback phase, as the level of data in the video buffer gradually increases. Therefore, once sync between audio and video streams is established and video playback rate is increased to a normal rate (i.e., same as audio), the level in video decoder buffer 320 reaches the same level it would have reached had video playback not started early.

Figure 6:
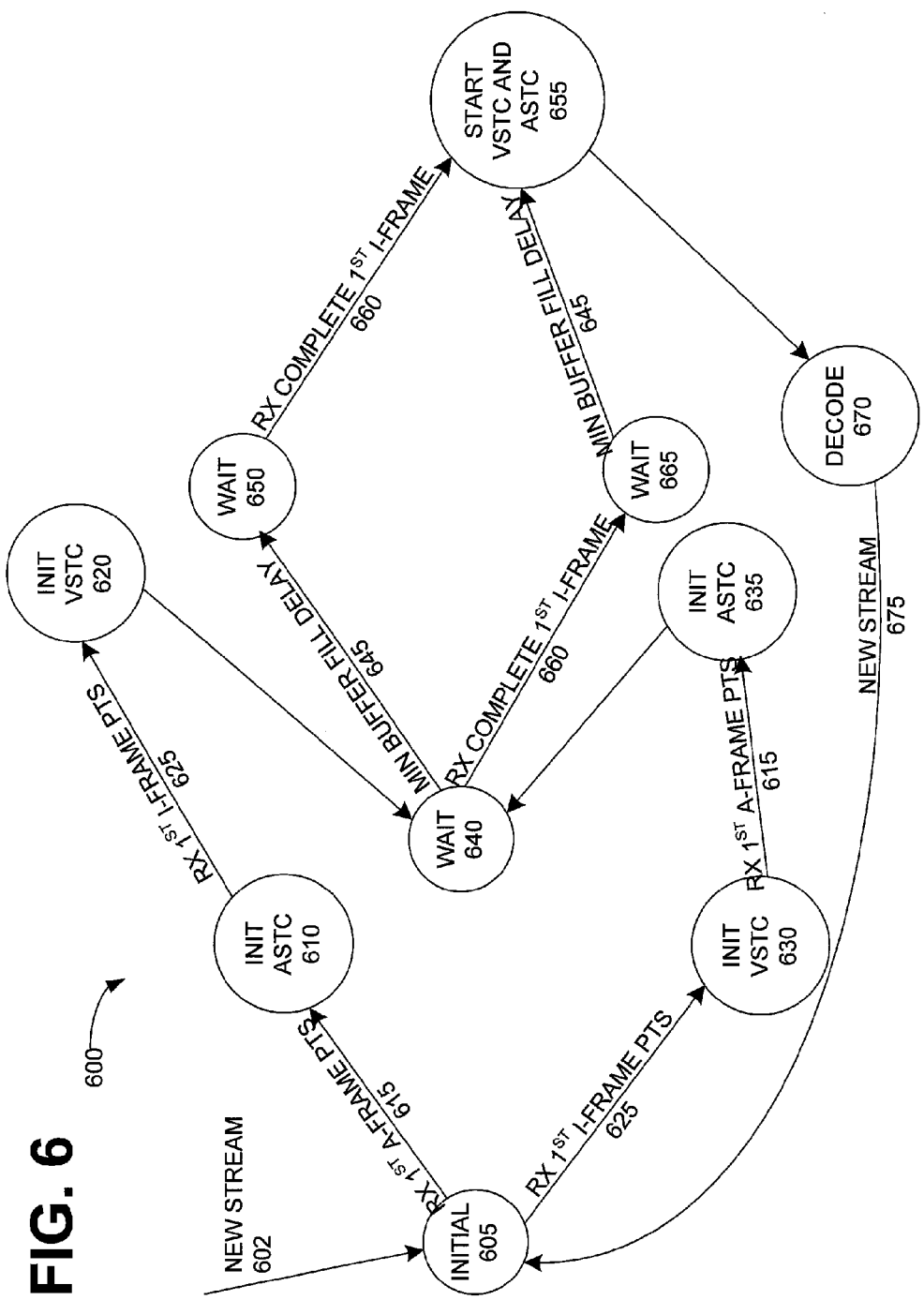
FIG. 6 is a state diagram illustrating operation of the independent decoder clocking logic of FIG. 1.

FIG. 6 is a state diagram illustrating operation of independent decoder clocking logic 190. Logic 190 moves to initial state 605 upon receiving the start of a new stream (event 602). From initial state 605, logic 190 transitions to state 610 and initializes ASTC 385 when the PTS for the first decodable audio frame is received (event 615). From state 610, logic 190 transitions to state 620 and initializes VSTC 390 when the PTS for the first decodable video frame is received (event 625). Alternatively, if the PTS for the first decodable video frame (625) is received while in initial state 605, logic 190 transitions to state 630 and initializes VSTC 390 then transitions to state 635 and initializes ASTC 385 when the PTS for the first decodable audio frame is received (event 615).

From either state 620 or state 635, independent decoder clocking logic 190 transitions unconditionally to state 640. Expiration of the minimum audio buffer fill delay (event 645) results in the transition from state 640 to state 650. From state 650, logic 190 transitions to state 655 and starts both ASTC 385 and VSTC 390 when the first complete decodable video frame is received (event 660). Alternatively, if the first complete decodable video frame (event 660) is received while in state 640, logic 190 transitions to state 665, and from there transitions to state 655 (where ASTC 385 and VSTC 390 are started) when the minimum audio buffer fill delay expires (event 645). Logic 190 moves unconditionally from state 655 to state 670, where decoding begins. Finally, when a new stream begins (event 602) logic 190 returns to initial state 605.

Independent decoder clocking logic 190 can be utilized in any digital media receiver that receives an encoded video stream and a corresponding encoded audio stream. Examples of such devices include set-top boxes, personal video recorders, home media center, residential gateway, hand-held and/or mobile receivers that are coupled to a transmission channel, video-services-enabled receivers (VSERs), and other electronic devices such as media players.

Figure 7:
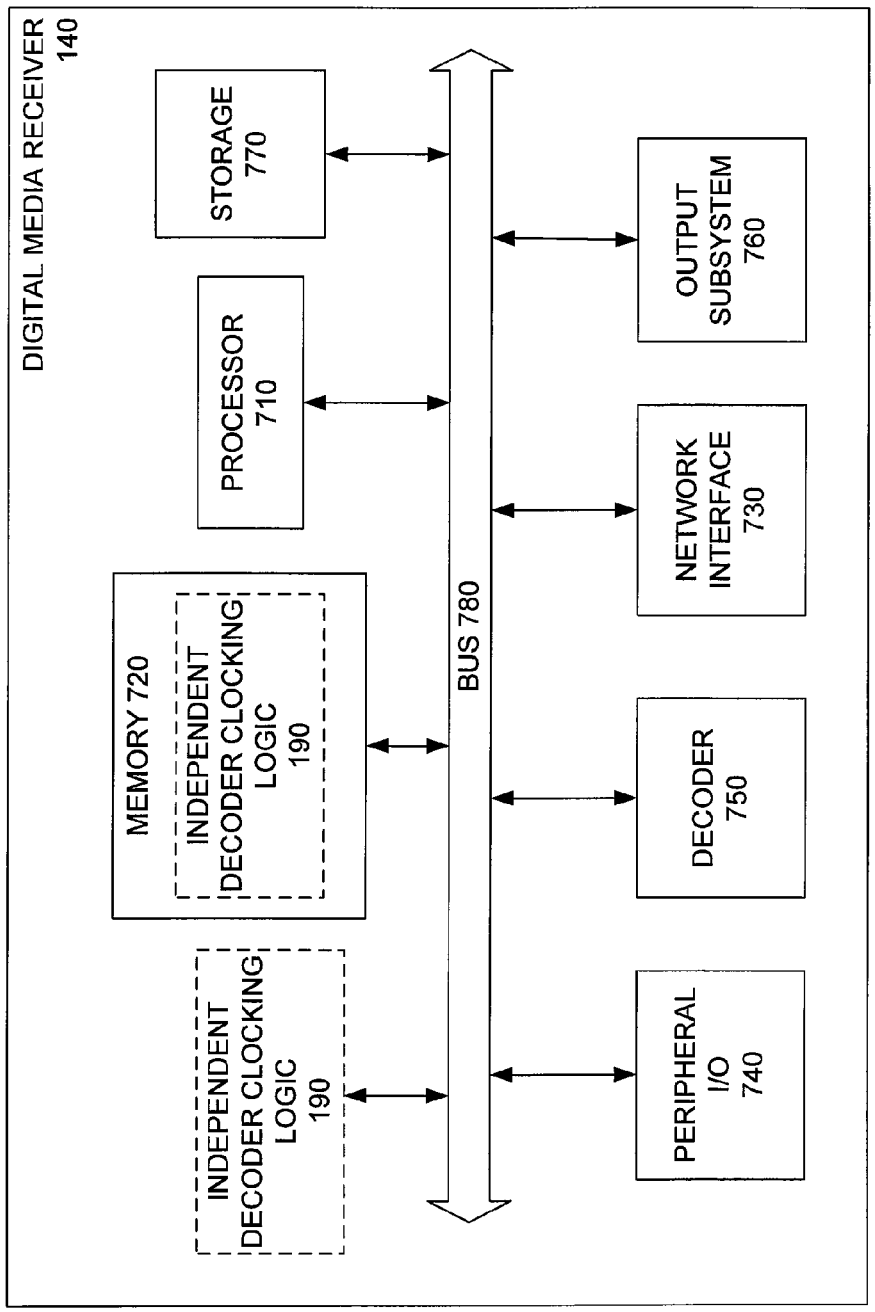
FIG. 7 is a block diagram of one embodiment of digital media receiver of FIG. 1.

FIG. 7 is a block diagram of one embodiment of digital media receiver 140. Digital media receiver 140 contains a number of components that are well known in the computer arts, including a processor 710, memory 720, a network interface 730, a peripheral input output (I/O) interface 740, a decoder 750, and an output subsystem 760. Some embodiments also include a storage device 770 (e.g., non-volatile memory or a disk drive). These components are coupled via a bus 780. Omitted from FIG. 7 are a number of conventional components that are unnecessary to explain the operation of digital media receiver 140.

Peripheral I/O interface 740 provides input and output signals, for example, user inputs from a remote control or front panel buttons or a keyboard, and outputs such as LEDs or LCD on the front panel. Network interface 730 receives streams. Decoder 750 decodes an incoming video stream into a stream of decoded video frames and an incoming audio stream into a stream of decoded audio streams. Output subsystem 760 converts the decoded video frames into a video signal for display by a computer monitor or a television and converts the decoded audio frames into an audio signal for play over speakers.

As described above, digital media receiver 140 receives digital video streams via network interface 730. In some embodiments, this is a local area network (LAN) interface or a wide area network (WAN) interface such as the Internet. In other embodiments, network interface 730 interfaces to a radio frequency (RF) network, and in such embodiments digital media receiver 140 may include a tuner/demodulator (not shown) which processes digital signals received over the RF network.

As shown in FIG. 7, independent decoder clocking logic 190 may be implemented in hardware, or may reside in memory 720 as instructions which, when executed by processor 710, implement systems and methods of reducing media stream delay through independent decoder clocks. Hardware implementations include, but are not limited to, a programmable logic device (PLD), programmable gate array (PGA), field programmable gate array (FPGA), an application-specific integrated circuit (ASIC), a system on chip (SoC), and a system in package (SiP). Furthermore, independent decoder clocking logic 190 may be implemented as a combination of hardware logic and processor-executable instructions (software).

Independent decoder clocking logic 190 can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or that is based on electronic, magnetic, optical, electromagnetic, infrared, or semiconductor technology.

Specific examples of a computer-readable medium using electronic technology would include (but are not limited to) the following: random access memory (RAM); read-only memory (ROM); and erasable programmable read-only memory (EPROM or Flash memory). A specific example using magnetic technology includes (but is not limited to) a portable computer diskette. Specific examples using optical technology include (but are not limited to) compact disk (CD) and digital video disk (DVD).

Any software components illustrated herein are abstractions chosen to illustrate how functionality is partitioned among components in some embodiments of independent decoder clocking logic 190 disclosed herein. Other divisions of functionality are also possible, and these other possibilities are intended to be within the scope of this disclosure. Furthermore, to the extent that software components are described in terms of specific data structures (e.g., arrays, lists, flags, pointers, collections, etc.), other data structures providing similar functionality can be used instead.

Any software components included herein are described in terms of code and data, rather than with reference to a particular hardware device executing that code. Furthermore, to the extent that system and methods are described in object-oriented terms, there is no requirement that the systems and methods be implemented in an object-oriented language. Rather, the systems and methods can be implemented in any programming language, and executed on any hardware platform.

Any software components referred to herein include executable code that is packaged, for example, as a standalone executable file, a library, a shared library, a loadable module, a driver, or an assembly, as well as interpreted code that is packaged, for example, as a class. In general, the components used by the systems and methods of reducing media stream delay are described herein in terms of code and data, rather than with reference to a particular hardware device executing that code. Furthermore, the systems and methods can be implemented in any programming language, and executed on any hardware platform.

The flow charts, messaging diagrams, state diagrams, and/or data flow diagrams herein provide examples of the operation of systems and methods of reducing media stream delay through independent decoder clocks, according to embodiments disclosed herein. Alternatively, these diagrams may be viewed as depicting actions of an example of a method implemented by independent decoder clocking logic 190. Blocks in these diagrams represent procedures, functions, modules, or portions of code which include one or more executable instructions for implementing logical functions or steps in the process. Alternate implementations are also included within the scope of the disclosure. In these alternate implementations, functions may be executed out of order from that shown or discussed, including substantially concurrently or in reverse order, depending on the functionality involved. The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What is claimed is:

1. A method of reducing video delay in a program stream, the program stream comprising a video and an audio stream, the method comprising:
    setting an audio reference clock to an initial value based on a presentation timestamp for a frame that is the first decodable frame in the audio stream;
    setting a video reference clock to an initial value based on a presentation timestamp for a frame that is the first decodable frame in the video stream;
    starting audio and video reference clocks responsive to the later of a minimum buffer fill delay and receipt of a frame that is the first entire decodable frame in the video stream;
    upon expiration of a delay $D_{REF}$, incrementing the initial value of the audio reference clock by an overshoot audio delay $D_{AA}$, if a delay $D_A$ has elapsed, the overshoot audio delay $D_{AA}$ being a difference between a time that the delay $D_A$ elapsed and a time that the delay $D_{REF}$ elapsed, the delay $D_{REF}$ being the difference between the setting of the video reference clock and a time to completely receive a frame into a video decoder buffer that is a first decodable video frame, the delay $D_A$ being a minimum audio buffering delay;
    decoding the audio stream in accordance with the audio reference clock; and
    decoding the video stream in accordance with the video reference clock.

2. The method of claim 1, further comprising:
    initially setting the rate of the video reference clock to be slower than the rate of the audio reference clock.

3. The method of claim 1, further comprising:
    setting the rate of the video reference clock to the same as the rate of the audio reference clock, responsive to current values of the video reference clock and the audio reference clock being the same.

4. The method of claim 1, wherein the initial value of the audio reference clock is equal to a presentation timestamp value for the first decodable frame in the audio stream.

5. The method of claim 1, wherein the initial value of the video reference clock is equal to a presentation timestamp value for the first decodable frame in the video stream.

6. The method of claim 1, wherein setting the video reference clock is responsive to receipt of a presentation timestamp for the first decodable frame in the video stream.

7. The method of claim 1, wherein setting the audio reference clock is responsive to receipt of a presentation timestamp for the first decodable frame in the audio stream.

8. The device of claim 1, where the logic configured to set the audio reference clock is responsive to receipt of a presentation timestamp for the first decodable frame in the audio stream.

9. A digital media playback device comprising:
    an audio reference clock;
    an audio decoder buffer configured to store received frames in an audio stream;
    an audio decoder configured to decode frames in the audio decoder buffer at times based on a comparison of a time stamp for each frame and a current value of the audio reference clock;
    a video reference clock;
    a video decoder buffer configured to store received frames in a video stream, the video stream and the audio stream making up a program stream;
    a video decoder configured to decode frames in the video decoder buffer at times based on a comparison of a timestamp for each frame and a current value of the video reference clock; and
    independent decoder clocking logic configured to:
        set the audio reference clock to an initial value based on a presentation timestamp for a frame that is the first decodable frame in the audio stream, the independent decoder clocking logic configured to set the audio reference clock to the initial value further comprises the independent decoder clocking logic configured to, upon expiration of a delay $D_{REF}$, increment the initial value of the audio reference clock by an overshoot audio delay $D_{AA}$, if a delay $D_A$ has elapsed, the overshoot audio delay $D_{AA}$ being a difference between a time that the delay $D_A$ elapsed and a time that the delay $D_{REF}$ elapsed, the delay $D_{REF}$ being the difference between the setting of the video reference clock and a time to completely receive a frame into a video decoder buffer that is a first decodable video frame, and wherein $D_A$ is a minimum audio buffering delay;
        set the video reference clock to an initial value based on a presentation timestamp for a frame that is the first decodable frame in the video stream; and
        start the audio and the video reference clocks responsive to the later of a minimum buffer fill delay and receipt of a frame that is the first entire decodable frame in the video stream.

10. The device of claim 9, further comprising channel change request logic, wherein the setting the audio and video reference clocks is responsive to the channel change request logic.

11. The device of claim 9, further comprising:
    logic to initially set the rate of the video reference clock to be slower than the rate of the audio reference clock.

12. The device of claim 9, further comprising:
    logic to set the rate of the video reference clock to the same as the rate of the audio reference clock, responsive to values in the video reference clock and the audio reference clock being the same.

13. The device of claim 9, wherein the initial value of the audio reference clock is a presentation timestamp value for the first decodable frame in the audio stream.

14. The device of claim 9, wherein the initial value of the video reference clock is equal to the value of a presentation timestamp for the first decodable frame in the video stream.

15. The device of claim 9, wherein the logic configured to set the video reference clock is responsive to receipt of a presentation timestamp for the first decodable frame in the video stream.

16. A digital media playback device comprising:
means for generating an audio reference clock;
means for buffering frames in a received audio stream;
means for decoding frames in the audio decoder buffer according to the audio reference clock;
means for generating a video reference clock;
means for buffering frames in a received video stream, the video stream and the audio stream making up a program stream;
means for decoding frames in the video decoder according to the video reference clock;
means for setting an initial value of the audio reference clock based on receipt of a frame that is the first decodable frame in the audio stream;
means for setting an initial value of the video reference clock based on receipt of the start of a frame that is the first decodable frame in the video stream;
means for incrementing, upon expiration of a delay $D_{REF}$, an initial value of the audio reference clock by an overshoot audio delay $D_{\Delta A}$, if a delay $D_A$ has elapsed, the overshoot audio delay $D_{\Delta A}$ being a difference between a time that the delay $D_A$ elapsed and a time that the delay $D_{REF}$ elapsed, the delay $D_{REF}$ being the difference between the setting of the video reference clock and the time to completely receive a frame into a video decoder buffer that is a first decodable video frame, the delay $D_A$ being a minimum audio buffering delay; and
means for starting the audio and the video reference clocks on the later of a minimum buffer fill delay and receipt of the entire first decodable frame.

17. The device of claim 16, further comprising:
means for initially setting the rate of the video reference clock to be slower than the rate of the audio reference clock.

18. The device of claim 16, further comprising:
means for setting the rate of the video reference clock to the same value as the rate of the audio reference clock, responsive to values in the video reference clock and the audio reference clock being the same.

19. The device of claim 16, wherein the means for generating an audio reference clock is responsive to timestamps in the received audio stream, and the means for generating a video reference clock is responsive to timestamps in the received video stream.

* * * * *